Aug. 9, 1932.　　　W. N. BOOTH　　　1,871,145
VEHICLE WHEEL
Filed Dec. 12, 1927
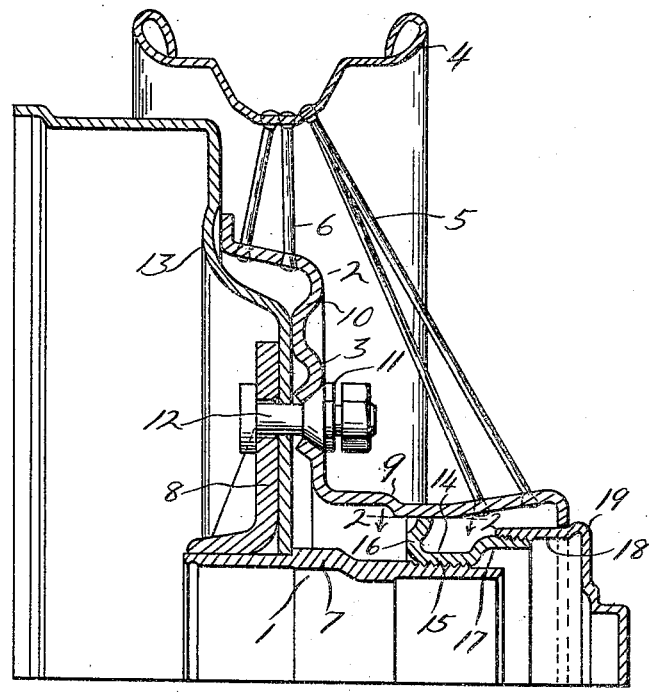
Fig. 2.
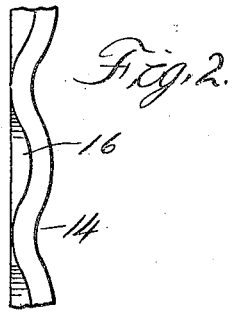
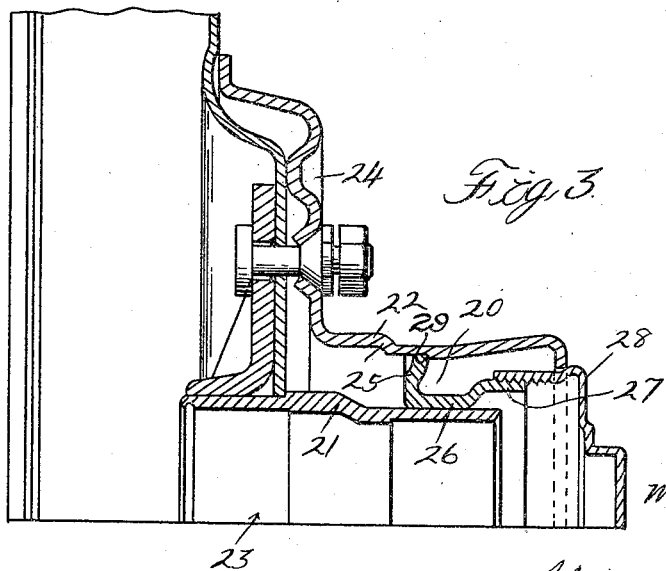
Fig. 3.
Inventor
William N. Booth
Attorney Patented Aug. 9, 1932

1,871,145

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

VEHICLE WHEEL

Application filed December 12, 1927. Serial No. 239,565.

The invention relates to vehicle wheels and more particularly refers to wire wheels. One of the objects of the invention is the provision in a wheel of that type having a hub and a hub shell of a spacer between the hub and hub shell barrels to provide for decreasing the size and also the cost of manufacture of the hub. Another object is to provide a spacer which may be cheaply manufactured and mounted in place.

Further objects of the invention reside in the novel features of construction and combinations and arrangements of parts as more fully hereinafter set forth.

This application contains subject matter originally shown in my co-pending application Serial Number 162,653, filed January 21, 1927.

In the drawing:—

Figure 1 is a transverse section through a vehicle wheel embodying my invention;

Figure 2 is a cross section on the line 2—2 of Figure 1;

Figure 3 is a view similar to Figure 1 showing a modification.

The vehicle wheel shown in the drawing is a wire wheel comprising a wheel body and a hub so arranged that the wheel body may be applied to or removed from the hub. This wheel has the hub 1 and the wheel body 2, which latter is formed of the hub shell 3, the rim 4 and the front and rear spokes 5 and 6, respectively. The hub 1 has the barrel 7 and the fixed flange 8, while the hub shell 3 has the barrel 9 and the outwardly extending flange 10, the front spokes 5 being connected to the front end of the barrel and the rear spokes 6 being connected to the peripheral portion of the outwardly extending flange. The barrel 7 is of reduced size to reduce the cost of manufacture of the hub and is concentric with and spaced from the barrel 9. The hub shell is preferably secured to the hub by means of the nuts 11 and the bolts 12, the latter extending through the fixed flange 8, the web of the brake drum 13 and the outwardly extending flange 10 and being suitably held from rotation relative thereto as by means of fins engaging in channels formed in the fixed flange.

For spacing the hub barrel 7 and the hub shell barrel 9 from each other, I have provided the annular sheet metal spacer 14. This spacer has the central portion 15 which is internally threaded to engage external threads upon the front end of the hub barrel 7 and an annular flange portion 16, which is corrugated with the end of its corrugations abutting the inner face of the hub shell barrel, the corrugations in addition to reinforcing the annular flange portion providing an extended area of contact with the hub shell barrel. The spacer also preferably has the cylindrical portion 17 at its front end of greater diameter than the central portion 15 and externally threaded for engagement by the hub cap 18, which latter has the annular bead 19 for frictionally engaging the front end of the hub shell barrel, the arrangement being such that the hub cap locks the spacer in place.

In the modification shown in Figure 3, 20 is the annular sheet metal spacer between the barrels 21 and 22 of the hub 23 and hub shell 24, respectively. This spacer has the annular flange portion 25 which is preferably corrugated with the end of its corrugations abutting the inner face of the hub shell barrel. This spacer has a central portion 26 for slidably engaging the hub barrel and the cylindrical portion 27 at its front end and preferably of greater diameter than the central portion. This cylindrical portion is externally threaded for engagement by the hub cap 28 which is arranged in the same manner as the hub cap 18. The spacer is fixedly secured to the hub shell barrel, it having a force fit therewith and being engaged therewith by an axial movement in an outward direction relative thereto until it comes against the shoulder 29 formed upon the hub shell barrel.

From the above description it will be readily seen that I have provided an improved construction of vehicle wheel the hub of which is decreased in size to reduce the cost of manufacture and the hub shell of which is of proper size. It will also be seen that I have provided a simple construction of spacer between the hub and hub shell, which spacer may be cheaply manufactured and assembled in the wheel.

What I claim as my invention is:

1. In a vehicle wheel, the combination with a hub having a barrel, of a hub shell having a barrel spaced from said hub barrel, and a sheet metal spacer threadedly engaging said hub barrel and provided with an outwardly extending corrugated flange abutting said hub shell barrel to form an extended bearing therefor.

2. In a vehicle wheel, the combination with a hub having a barrel, of a hub shell having a barrel spaced from said hub barrel, a sheet metal spacer having a portion threadedly engaging said hub barrel, and an outwardly extending corrugated flange for abutting said hub shell barrel to form an extended bearing therefor, and a hub cap threadedly engaging said spacer and frictionally engaging said hub shell barrel for locking said spacer upon said hub barrel.

3. In a vehicle wheel, the combination with a hub having a barrel, of a hub shell having a barrel surrounding and spaced from the barrel aforesaid, a sheet metal spacer having an intermediate portion secured to said hub barrel and terminating at the opposite ends thereof in projecting flanges, one of said flanges engageable with the hub shell barrel to form a bearing therefor, and a hub cap mounted upon the other of said flanges.

In testimony whereof I affix my signature.

WILLIAM N. BOOTH.